United States Patent
Spinosa et al.

(10) Patent No.: US 6,830,216 B2
(45) Date of Patent: Dec. 14, 2004

(54) METHOD FOR RETROFITTING AN INERTIA REEL ACCESS DOOR TO AN EJECTION SEAT

(75) Inventors: Dominic Spinosa, Wantagh, NY (US); Frank Knoll, Huntington Station, NY (US); Jeffrey F. Walsh, Central Islip, NY (US)

(73) Assignee: East/West Industries, Inc., Ronkonkoma, NY (US)

( * ) Notice: Subject to any disclaimer, the term of this patent is extended or adjusted under 35 U.S.C. 154(b) by 0 days.

(21) Appl. No.: 10/365,436

(22) Filed: Feb. 13, 2003

(65) Prior Publication Data

US 2004/0056145 A1 Mar. 25, 2004

Related U.S. Application Data

(60) Provisional application No. 60/379,394, filed on May 13, 2002.

(51) Int. Cl.[7] .............................................. B64D 25/10
(52) U.S. Cl. .................... 244/122 A; 29/401.1; 29/464; 408/3
(58) Field of Search ...................... 244/122 A, 122 AD, 244/122 AG, 122 AH; 29/401.1, 464; 408/3

(56) References Cited

U.S. PATENT DOCUMENTS

| | | | |
|---|---|---|---|
| 3,662,731 A | 5/1972 | McIntyre | |
| 3,985,168 A | 10/1976 | Lundquist | |
| 4,667,902 A | 5/1987 | Zenobi | |
| 4,711,411 A | 12/1987 | Copp | |
| 4,792,903 A | 12/1988 | Peck et al. ...................... | 701/3 |
| 6,299,103 B1 * | 10/2001 | Shope et al. | |
| 6,327,764 B1 | 12/2001 | Knoll et al. | |

FOREIGN PATENT DOCUMENTS

WO    WO 03/095268 A2    11/2003

OTHER PUBLICATIONS

Annynomus "Chapter 17 Emergency Egress From Aircraft", Revised by Ron Peveto, M.D., M.P.H., download from the internet on Nov. 30, 2002.
German, John, "FAA gives thumbs up to new aircraft repair technique, Delta L–1011 returns to trans–Atlantic service", Sandia LabNews, May 9, 1997, pp. 1–6, downloaded Nov. 30, 2002.
Bonsor, Kevin, "How Ejection Seats Work", downloaded from the Internet on Aug. 25, 2002.
Annynomus "ACES–II Ejection Seat Upgrade", ASC Engineering Fact Sheet, downloaded from internet Aug. 25, 2002.
Annynomus "F–16 Fighting Falcon", Military Analysis Network, downloaded from internet Feb. 5, 2003.

* cited by examiner

Primary Examiner—Robert P. Swiatek
(74) Attorney, Agent, or Firm—Cahn & Samuels, LLP

(57) ABSTRACT

A method and kit for retrofitting an inertia reel door onto the seat back of a pre-constructed ejection seat. The method includes removing existing rivets from the seat back exposing rivet holes. Alignment holes are then drilled into the seat back. An aperture is cut into the seat back along flanges of an upper support bracket and a drogue chute bracket. A doubler is aligned with the rivet holes and alignment holes in the seat back and then attached to the seat back. A track is attached to a wall of the aperture and an inertia reel is mounted to the track. An inertia reel door is attached to the doubler.

21 Claims, 9 Drawing Sheets

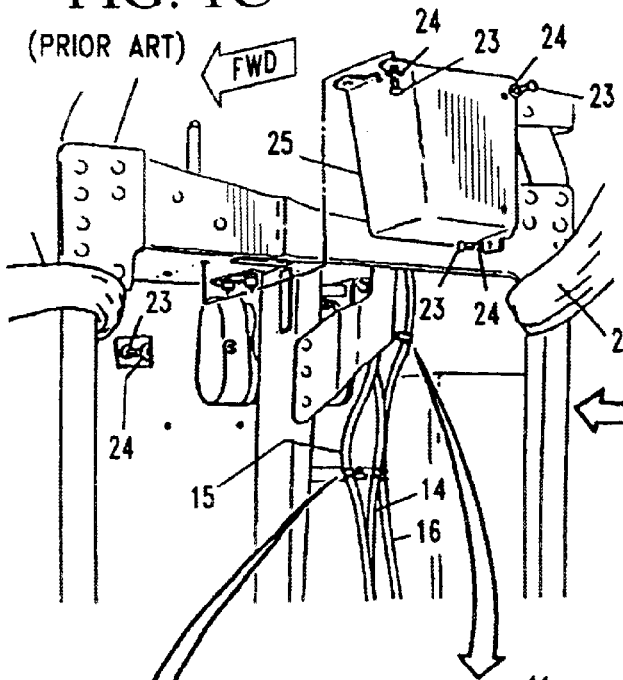
FIG. 1C (PRIOR ART)
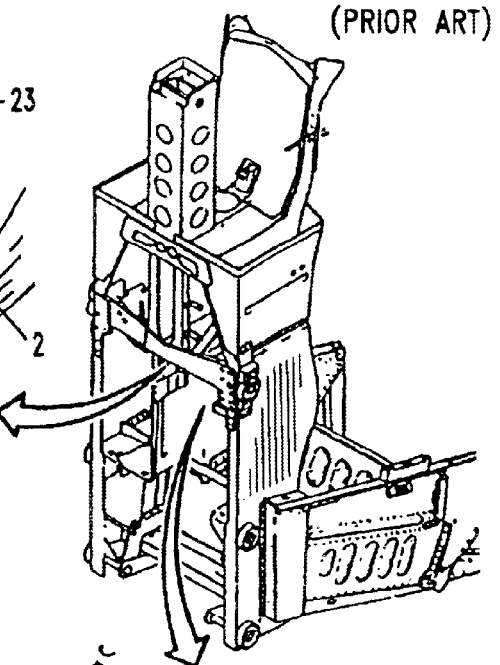
FIG. 1A (PRIOR ART)
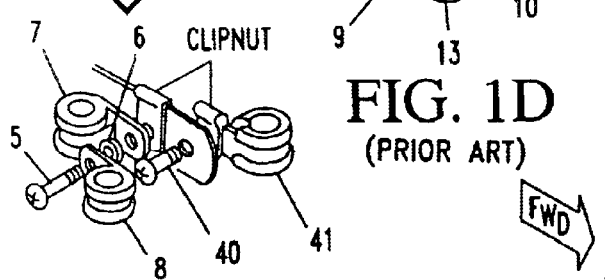
FIG. 1D (PRIOR ART)
FIG. 1E (PRIOR ART)
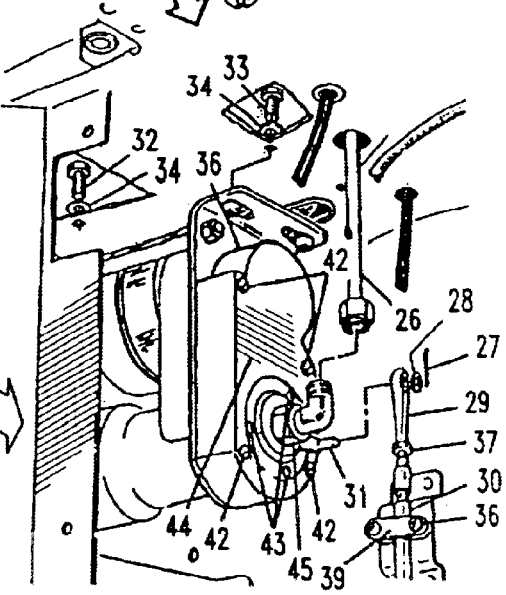
FIG. 1B (PRIOR ART)

METHOD FOR RETROFITTING AN INERTIA REEL ACCESS DOOR TO AN EJECTION SEAT

This application claims the benefit of U.S. provisional Application Ser. No. 60/379,394, filed May 13, 2002 that is herein incorporated by reference in its entirety.

FIELD OF THE INVENTION

This invention relates to safety devices for seats. More particularly, this invention relates to improvements in safety devices for ejection seats in aircraft.

BACKGROUND OF THE INVENTION

Aviation is one of the true marvels of modern man. Defying gravity through the use of high-powered machinery allows man to travel at great speed and great altitudes over great distances. However, as will be appreciated, the speeds and altitudes reached in connection with aviation pose a significant safety risk to human occupants in the event of mechanical failure, the compromising of the integrity of the aircraft, severely inclement weather, or other catastrophic events that could lead to the aircraft crashing or exploding.

The risks posed upon aircraft occupants are particularly acute in connection with high-performance aircraft and military aircraft. These vehicles are subjected to the most dangerous speeds and conditions known in the art. For example, military aircraft must be fast aircraft to maneuver as necessary in battle, must enter areas of hostile fire, and must be prepared to fly and land in the most difficult of weather and terrain conditions. Numerous artisans have labored to provide aircraft with the most advanced engineering advantages to ensure its occupants with the greatest chances of success in battle while minimizing the dangers inherent in hostile aviation.

Recognizing the inability to ensure the safe landing of aircraft, some prior artisans focused on methods and devices for allowing occupants to exit the aircraft with the greatest hopes of survival given the speeds and altitudes faced. Early innovations were made in the technology of parachutes. In theory, by making parachutes available to aircraft occupants, the occupants could don the parachutes and bail out of the aircraft at a sufficient altitude to allow them to float to the ground and avoid death or serious bodily injury. Unfortunately, as will be appreciated, not all occupants have the time to retrieve a parachute or reach an exit in the event of a catastrophic event. This proved to be particularly true as aircraft and anti-aircraft weaponry became more sophisticated and escape times much shorter.

In an effort to overcome the inability of occupants to maneuver to an exit to quickly egress from an aircraft, other prior artisans developed the ejection seat. An ejection seat allows a seat occupant to eject the seat and themself from the aircraft extremely quickly. An ejection seat is a complex device with numerous cooperating systems. In theory, the seat provides an automatic ejection sequence for an aircraft occupant, such as a military crewmember. The sequence starts when the crewmember pulls the firing control handle on the seat. The mode of operation is selected and controlled by a recovery sequencer. The sequencer provides the best recovery means for the full range of escape conditions. Three modes of operation are available. The mode selected depends on aircraft speed and altitude at the time of ejection.

Again, as will be appreciated, as the speed and conditions faced by modern aircraft became more hazardous, improvements in the protection offered by ejection seats was necessary. A particular feature of ejection seats that required modernization was the inertia reel harness assembly. The supersonic speeds and G-forces seat occupants are exposed to necessitates a mechanism be provided to prevent occupants from succumbing to forward g-force motion and injuring themselves. Also, the force and speed that an ejecting pilot is exposed to upon rocket-propelled expulsion from the aircraft would surely result in neck and spinal injury unless a mechanism is provided to secure the pilot to the seat back. Typically, these two hazards are dealt with by a properly functioning inertia reel harness assembly.

As illustrated in FIG. 1, the inertia reel harness assembly is located in the center of the seat back below the headrest. The inertia reel fulfills two function: (1) it acts like the shoulder belt in a car, restraining the pilot against a forward (−x) motion, and (2) upon ejection, it retracts the pilot to an upright posture to minimize the possibility of spinal damage due to spinal misalignment upon catapult ignition. With modern aircraft, the left side of the seat bucket is provided with a handle that allows the crewmember to manually lock the reel prior to intense maneuvers or landing to prevent possible injuries resulting from not being securely fastened in the seat.

Inertia reels have become a critical component of seats in modern aviation. The proper function of these reels has posed significant problems in the art due to their constant maintenance requirements. For example, as will be appreciated, inertia reels are monitored for proper functioning and settings including inspection of the control cam lever assembly and the mechanism cover for loose and/or missing screws. Specifically, it is recommended that inertia reel straps be inspected every 30 days, and replaced at a minimum of every two years. It is further recommended that inertia reels be replaced upon the occurrence of any of the following conditions: 1) the inertia reel straps extend more than two inches with the inertia reel control handle in the locked position; or 2) the inertia reel straps extend less than 36 inches when pulled with the control handle in the unlocked position. It is recommended to at least service the inertia reel upon the occurrence of any of the following: 1) the inertia reel straps do not retract freely into inertia reel when released in the unlocked position; 2) the inertia reel straps do not retract back into the inertia reel and lock in the retracted position when straps are released from the extended position with control handle in the locked position; 3) the inertia reel control assembly binds; 4) the inertia reel does not lock automatically preventing further extension of straps with the inertia reel control in the unlocked position and the straps are extended rapidly in one motion and 5) inertia reel straps become worn or frayed.

Heretofore, in order to inspect and/or replace the inertia reel or any of the components of the inertia reel assembly, technicians typically employed a tedious multi-step process. This process may be expressed with reference to FIGS. 1A to 1E. In accordance with that process the technicians must first access the inertia reel assembly. To access the assembly, technicians first remove the recovery parachute assembly, remove the drogue parachute assembly, remove the drogue gun, and remove the environmental sensor. Next, technicians release mortar control cable 14, shoulder restraint cable 15 and ground service release cable 16 by removing screw 5, securing clamp 8 and spacer 6; removing screw 9, nut 11 and washer 10 securing clamps 12 and 13. Tube assembly 26 is then disconnected and removed from the inertia reel 36 and the technician plugs the tube assembly and caps the inertia reel inlet. Cotter pin 27 and washer 28 are then removed from lever 31. Next, tape is removed from screws 23 on the front side of the seat to allow removal of screws 23 and washers 24 from the seat. It is then recommended to cut and remove the sealant between fairing 25 and the seat structure and carefully remove fairing 25. It is only after the foregoing tedious procedure is complete that the technician has access to the inertia reel and can inspect, repair and/or replace the inertia reel in accordance with conventional procedures.

Utilizing the foregoing process, replacement of the inertia reel and/or the inertia reel straps takes the technician approximately 12–16 hours, most of which is spent gaining access to the inertia reel. As a result, ejection seats undergoing maintenance are out of commission for nearly two days. Over 8,000 ACES II ejection seats are currently in use by the United States Air Force and by the air defense fleets of over 20 other countries. Accordingly, the down time created by inertia reel repair/replacement using heretofore employed methods is detrimental to the readiness of the seat, the aircraft and the fleet and could lead to catastrophic results in the event of a crisis.

Accordingly, notwithstanding the existence of the above-described methods, a need still exists to modify existing aircraft seats to provide ready access to the inertia reel. There is also a need for a modified ejection seat that facilitates rapid access to the inertia reel.

SUMMARY OF THE INVENTION

It is an object of the invention to reduce the time needed to service inertia reels of ejection seats.

Another object of the invention is to make the servicing of inertia reels in ejection seats less complicated.

Still another object of the invention is to improve access to inertia reels mounted in ejection seats.

Yet another object of the invention is to reduce down time of aircraft that employ ejection seats having inertia reels.

BRIEF DESCRIPTION OF THE DRAWINGS

The present invention is described with reference to the accompanying drawings. In the drawings, like reference numbers indicate identical or functionally similar elements.

FIGS. 1A to 1E illustrate a components of a conventional ACES II ejection seat.

DETAILED DESCRIPTION OF THE DRAWINGS

The present invention is directed to a method for retrofitting an inertia reel door to an ejection seat to facilitate ready access to the inertia reel. In keeping with the method of the invention, an aperture or doorway may be cut in the seat back structure at a predetermined location proximate to the location of the inertia reel. Preferably, a determination of the location for forming the aperture is made without disassembling the seat or any of its components. Once the desired location for the aperture is determined, a doubler may be installed about the aperture to provide reinforcement for the inertia reel door. As used herein, the term doubler refers to a substantially contoured, rigid sheet-like structure having a cut-out portion about as large as the aperture in the seat back. The inertia reel door may then be installed over the doubler to facilitate ready access to the inertia reel.

Figure 2:
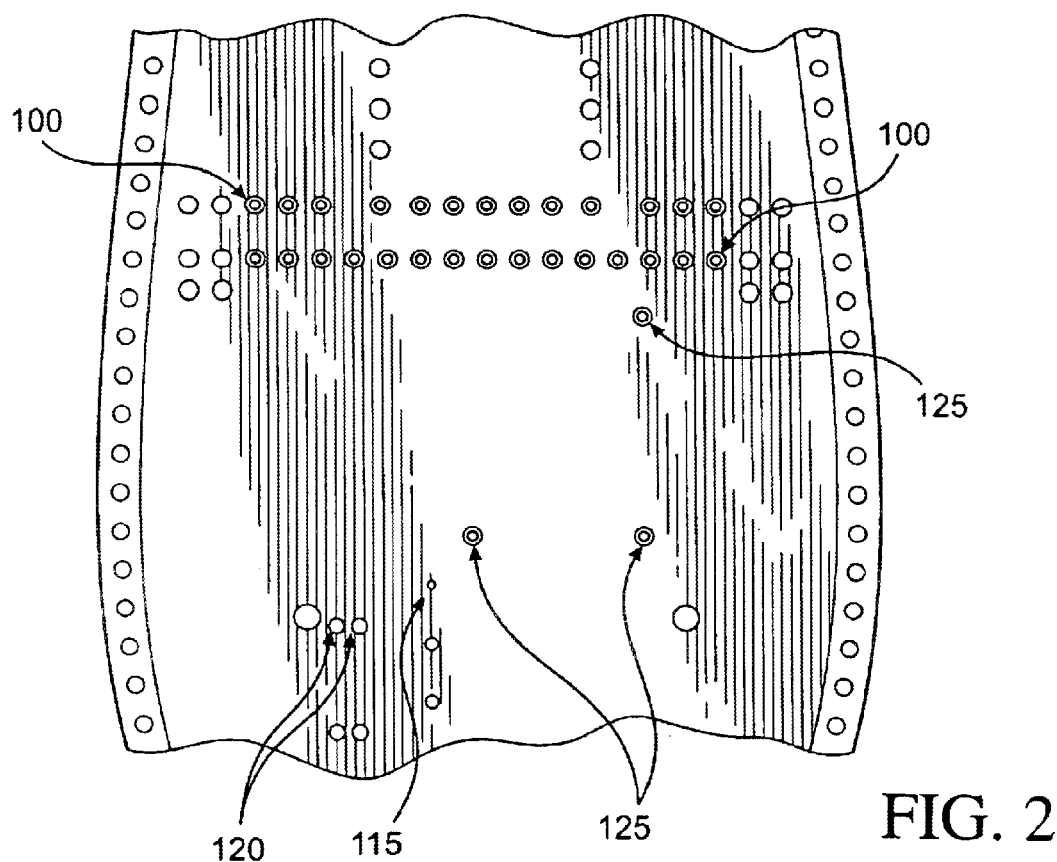
FIG. 2 is a plan view of the seat back of an ejection seat illustrating attachment holes in accordance with the invention.

In accordance with the present invention, a seat back doubler may be installed onto the ejection seat. As part of that installation, Referring to FIG. 2, existing rivets are preferably removed from the seat back in preparation for doubler installation. More particularly, a first set of existing rivets may be removed from upper flanges of the seat back and vertical support bracket (not shown in FIG. 2) exposing a first set of rivet holes 100. In preferred embodiments, the first set of existing rivets comprise about 28 CX-5N and BJ-4N rivets. A second set of existing rivets may be removed from a first vertical support bracket exposing a second set of rivet holes 115. In preferred embodiments, the second set of existing rivets may comprise one or more rivets. A third set of existing rivets may be removed from a second bracket exposing a third set of rivet holes 120. If present, tape may be removed from the seat back skin as illustrated in FIG. 2 and screws may be removed from a third bracket exposing screw holes 125. FIG. 2 depicts the surface of the seat back intended to contact the pilot/passenger's back hereinafter referred to as the front of the seat back. None of the first, second and third brackets are shown as they are disposed on the rear of the seat back.

Figure 3:
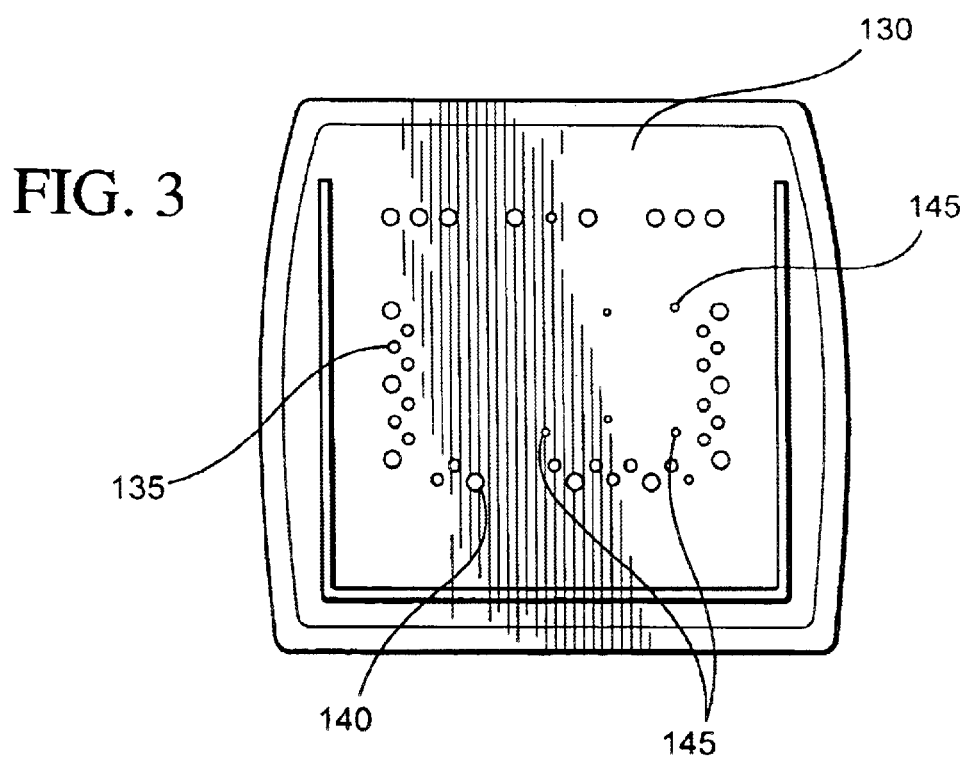
FIG. 3 depicts the drill fixture of the present invention attached to the seat back.

Once the rivets are removed, alignment holes may be formed in the seat back. In preferred embodiments, the alignment holes are formed using drill fixture 130 illustrated in FIG. 3. Drill fixture 130 preferably comprises a template used for determining the location of new holes that are needed for retrofitting the inertia reel door. More preferably, drill fixture 130 includes a plate-like structure having a plurality of alignment holes 135 of a first diameter and a plurality of alignment holes 140 of a second diameter generally forming a pattern of a square circumscribing a U-shaped pattern. The pattern formed by alignment holes 135 and 140 is preferably designed to interface with existing holes in the ejection seat using existing rivets as much as possible and to meet structural requirements of the ejection seat. The U-shaped pattern preferably includes only alignment holes 135. The square pattern preferably includes alignment holes 135 and alignment holes 140. There are preferably about 22 holes of the first diameter and about 15 holes of the second diameter. The first diameter is preferably about 0.128 inches and the second diameter is about 0.218 inches. Drill fixture 130 further includes attachment holes 145 positioned to overlay screw holes 125. A particularly preferred drill fixture is the 392T1001 drill fixture available from the instant assignee, East/West Industries, Inc. of Ronkonkoma, N.Y.

In keeping with the method aspects of the invention, drill fixture 130 is preferably installed to the seat back by mating attachment holes 145 with screw holes 125 and fastening drill fixture 130 preferably using the screws previously removed to expose screw holes 125. In step 260, alignment holes 135 are drilled through drill fixture 130 into the seat back. In step 270, alignment holes 140 are back drilled through drill fixture 130 into the seat back. Thereafter, drill fixture 130 may be removed.

Figure 4:
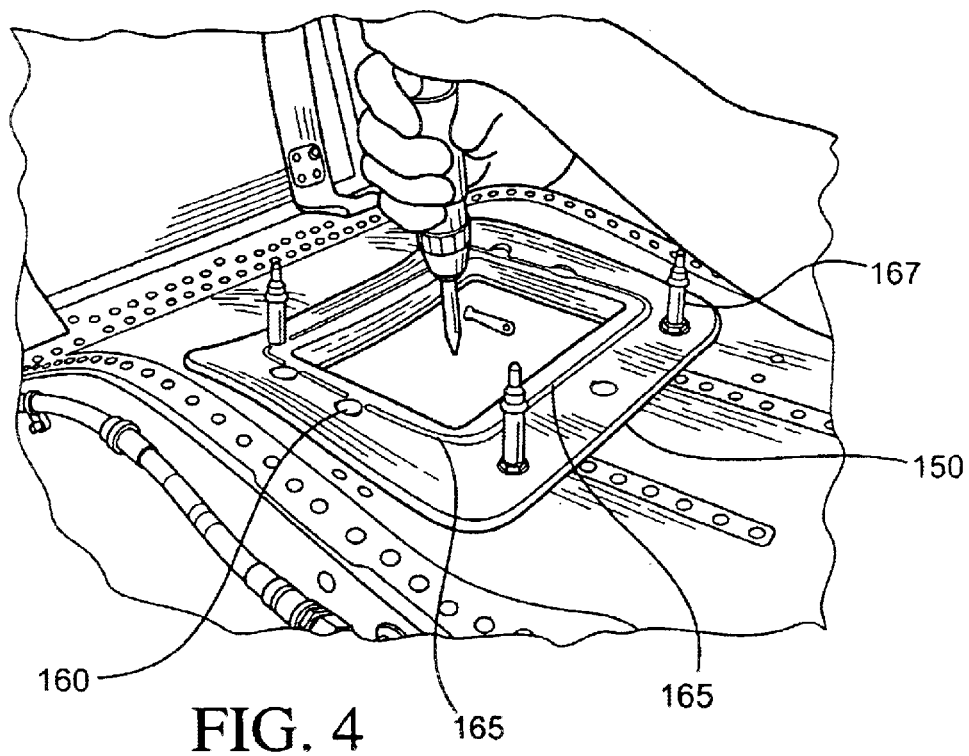
FIG. 4 illustrates the seat back router template of the present invention.
Figure 5:
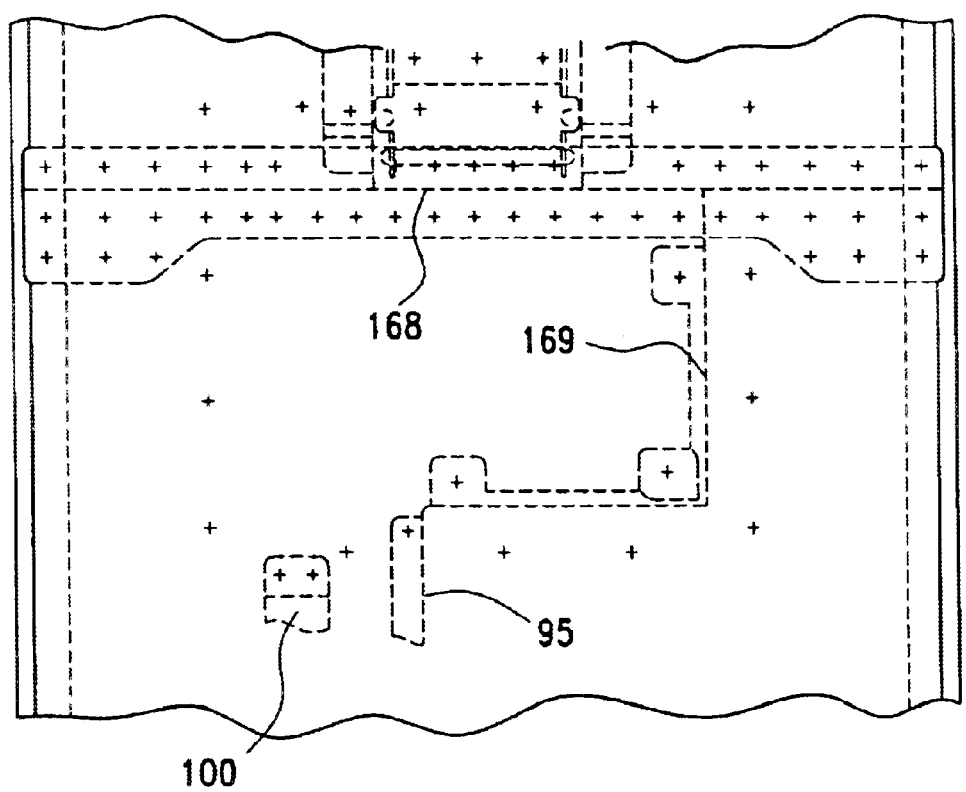
FIG. 5 is a diagram of the seat back showing the web, fairing and clip in accordance with the invention.

After formation of alignment holes, an aperture or doorway may be cut into the seat back. In preferred embodiments, as illustrated in FIG. 4, a seat back router template 150 may be installed in to the seat back and employed as a cutting template for outlining the area to be cut out. Seat back router template 150 preferably includes frame 155 having a plurality of attachment holes 160 that mate with alignment holes 135 and 140. Seat back router template 150 also includes an aperture 165 defined by frame 155. The inner periphery of frame 155 is disposed within at least about 0.015 inches from the flanges of web 168 and fairing 169 of the seat back depicted in FIG. 5. Cleco fasteners 167 are preferably provided to attach seat back router template 150 to the seat back. A preferred seat back router template 150 is the 392T1002 router template available from the instant assignee, East/Nest Industries, Inc. of Ronkonkoma, N.Y.

Figure 6:
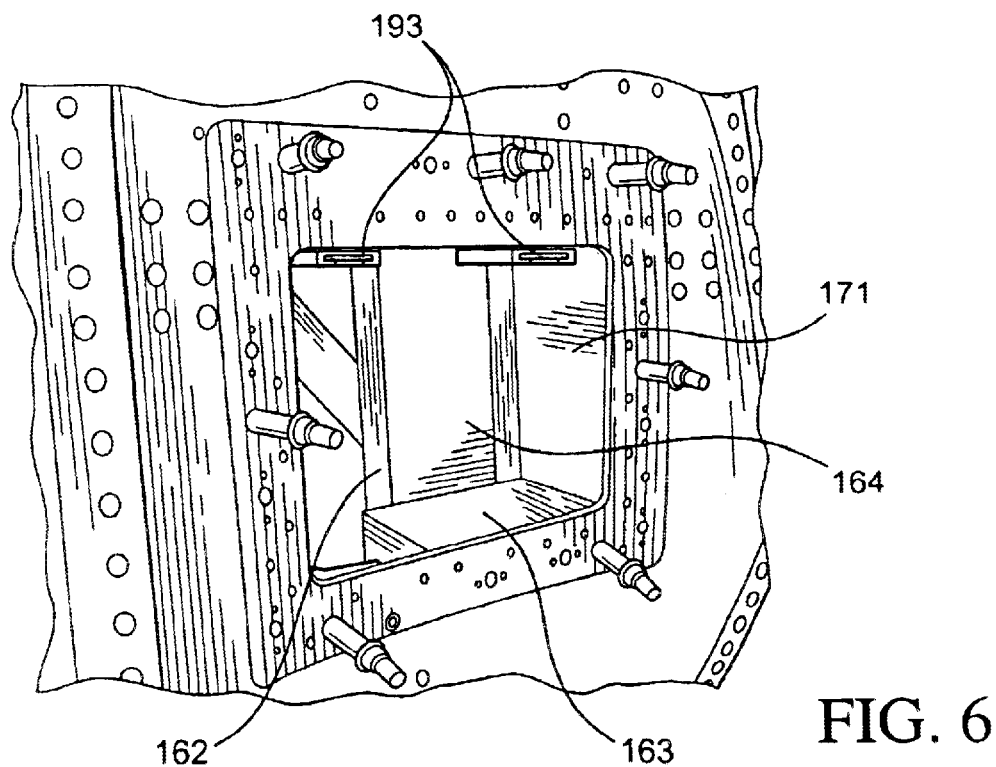
FIG. 6 illustrates the doubler of the present invention attached to the seat back.

Further in keeping with the invention, an aperture 166 may be cut in the seat back with a cutting tool, e.g., router bits, thus forming a hollow 162 in the seat back as shown in FIG. 6. The cutting tool is preferably routed along the flanges of an upper support bracket and a drogue chute bracket (both not shown) to within about 0.015 inches from the flanges of the web and the fairing. The desired routing may be done by running the cutting tool along the inner edge of seat back routing fixture 150. In an alternate embodiment, the desired cut may be made in the seat back without employing seat back router template 150. In such a case, a person knowledgeable of the location of web 168 and fairing 169 may manually or otherwise mark the seat back to facilitate cutting. Aperture 166 preferably has an area just large enough to facilitate ready insertion and removal of the inertia reel. More preferably aperture 165 has an area of about 5×7 square inches. After aperture 165 has been cut in the seat back, seat back routing fixture 150 is preferably removed.

Figure 7:
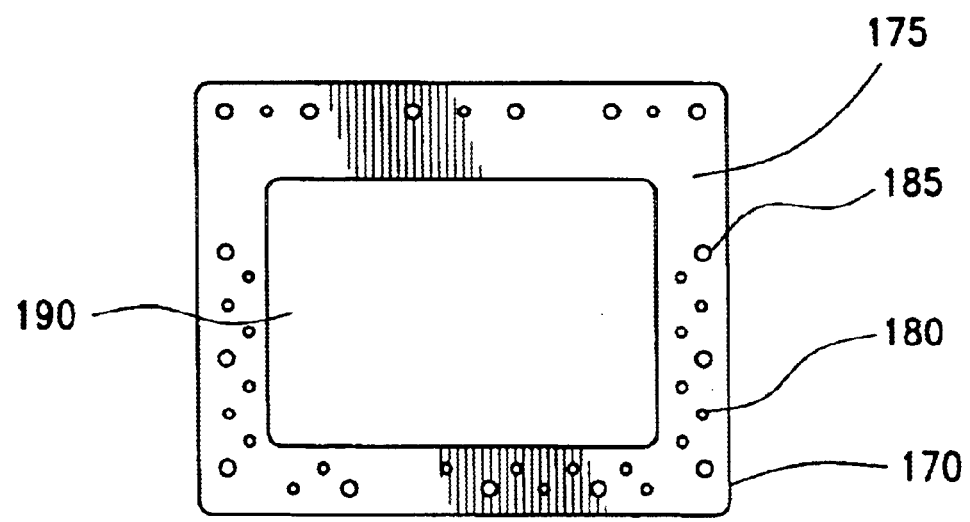
FIG. 7 is a diagram of the doubler of the present invention.
Figure 8:
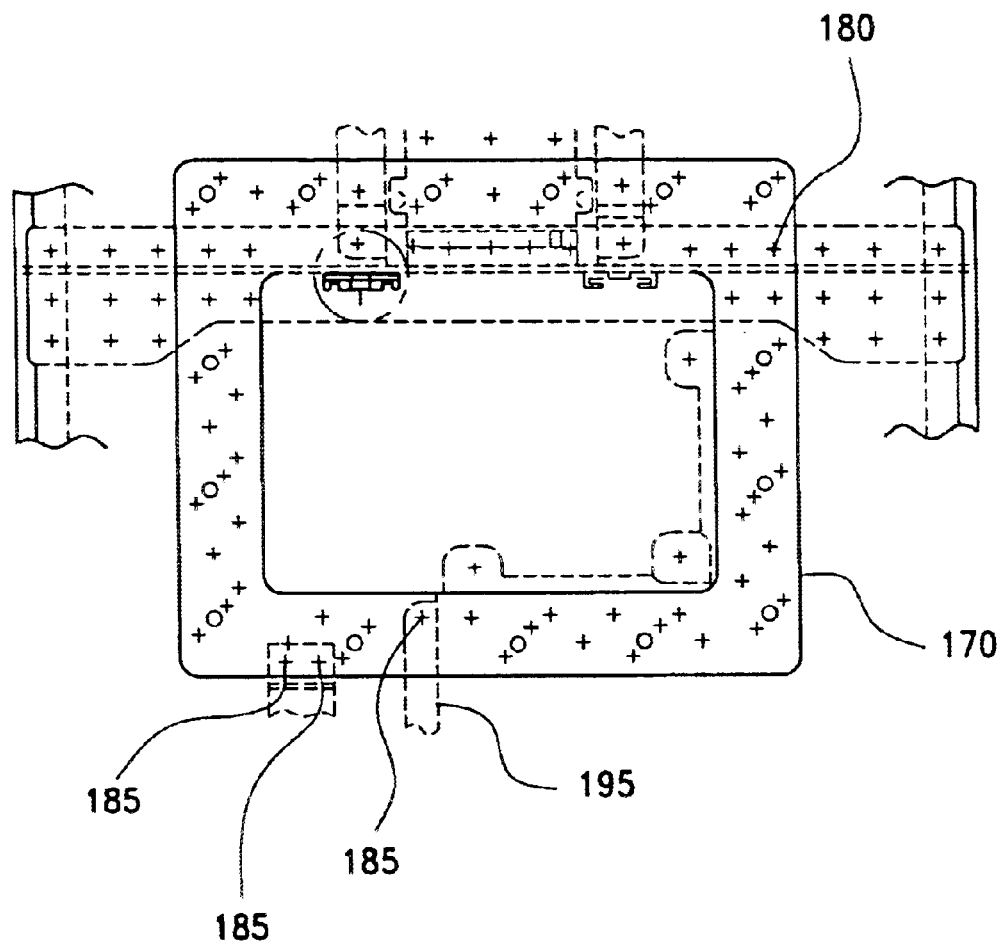
FIG. 8 is a diagram of the doubler of the present invention showing attachment holes in the clip and partition in accordance with the invention.
Figure 9:
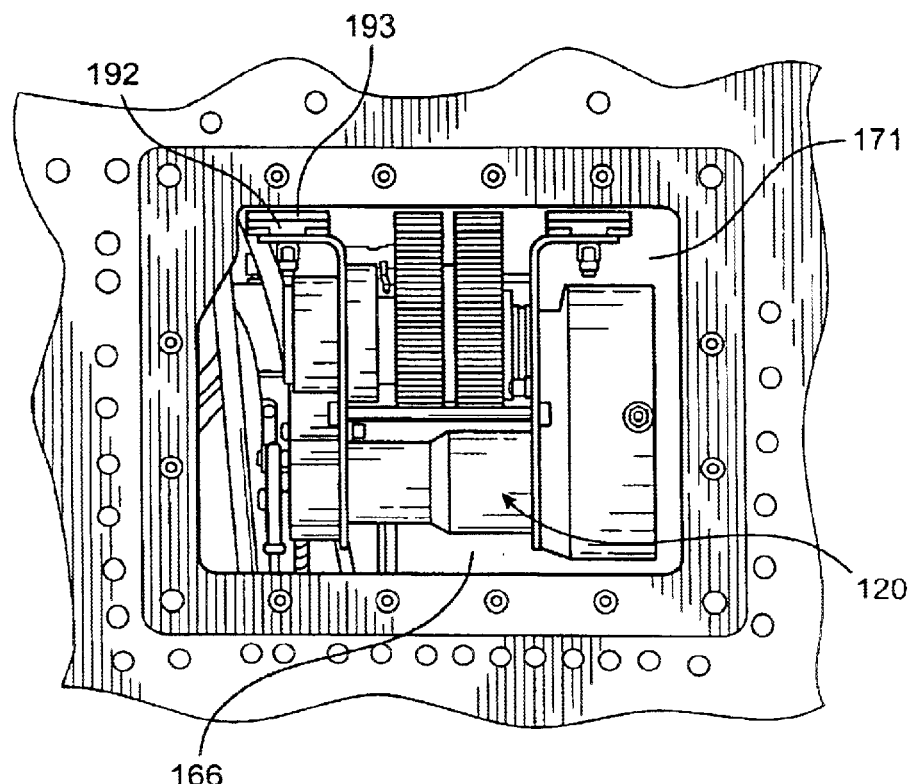
FIG. 9 illustrates the inertia reel mounted in the seat back in accordance with the invention.

To provide reinforcement for the inertia reel door, a doubler is preferably installed prior to installation of the inertia reel door. FIGS. 7 and 8 illustrate a doubler 170 in accordance with the present invention. In a preferred embodiment, doubler 170 comprises a frame 175 having a plurality of attachment holes 180 of a first diameter and a plurality of attachment holes 185 of a second diameter generally forming a pattern of a square circumscribing a U-shaped pattern. As shown in FIG. 7, the U-shaped pattern preferably includes only attachment holes 180. The square pattern preferably includes attachment holes 180 and 185. The pattern formed by attachment holes 180 and 185 is preferably the same as the pattern formed by alignment holes 135 and 140 shown in FIG. 3.

Doubler 170 also includes an aperture 190 defined by the inner perimeter of the frame 175. Aperture 190 is preferably large enough to facilitate access to the inertia reel and is about the same size as aperture 165. More preferably, the aperture has an area of about 5×7 square inches.

Doubler 170 may be installed by aligning attachment holes 180 and 185 with alignment holes 135 and 140 formed in the seat back from the drilling performed in step 260. Attachment holes 180 are preferably back drilled through the rivet holes 100 and the seat back skin and doubler 170. As illustrated in FIG. 8, one of attachment holes 180 is preferably back drilled through the flange of partition 195, the seat back skin and doubler 170. Two other attachment holes 185 are preferably back drilled through the clip 197, the seat back skin, and doubler 170. Additional attachment holes may be drilled through the seat back and doubler 170 in which flush head rivets may be disposed to fix doubler 170 to the seat back. More particularly, doubler 170 may be flush installed using the appropriate rivets, e.g., MS20426AD5-5 and MS20426AD4-5 rivets. Nutplates may be flush installed by drilling appropriate holes in seat back and attaching Nutplates preferably using rivets, e.g., MS20426AD3-5 rivets.

To simplify insertion and removal of the inertia reel as illustrated in FIG. 6, in keeping with a preferred feature of the invention, hollow 162 may be provided with a track system 193. Hollow 162 is preferably a modified box structure having an upper surface (not shown), a lower surface 163, a rear surface 164, and at least one side surface 171. Rear surface 164 may be provided with a cut-out portion to facilitate interconnection of the inertia reel with other parts of the aircraft seat. One or more tracks 193 may be installed on upper surface using the existing inertia reel mounting holes. In accordance with a preferred aspect of the invention, the inertia reel may be mounted directly to tracks 193.

Alternatively, the inertia reel may be provided with a slide 192 that engages track 193 such that the inertia reel may be slidingly removed from and inserted into the seat structure. In this case, track 193 is preferably configured to slidingly engage slide 192 and may have a C-shaped cross section. Slide 192 preferably has a truncated T-shaped cross section. A preferred track 193 is EWI 392C305 available from the present assignee, East/West Industries, Inc. of Ronkonkoma, N.Y. A preferred slide 192 is EWI 392C304 also available from East/West Industries, Inc.

Figure 10:
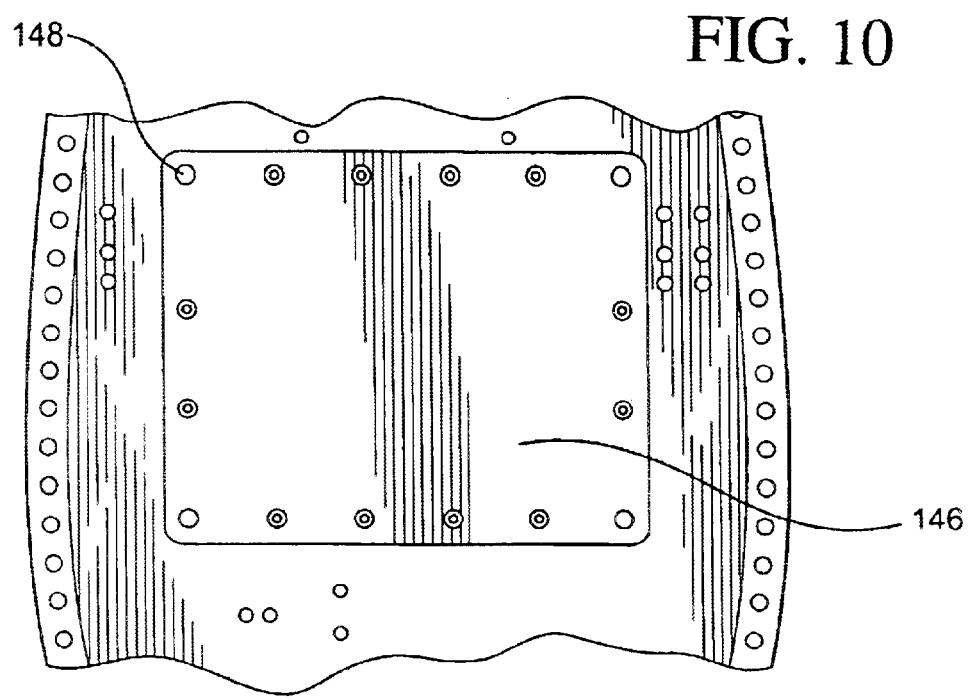
FIG. 10 depicts the inertia reel door attached to the seat back in accordance with an aspect of the invention.
Figure 11:
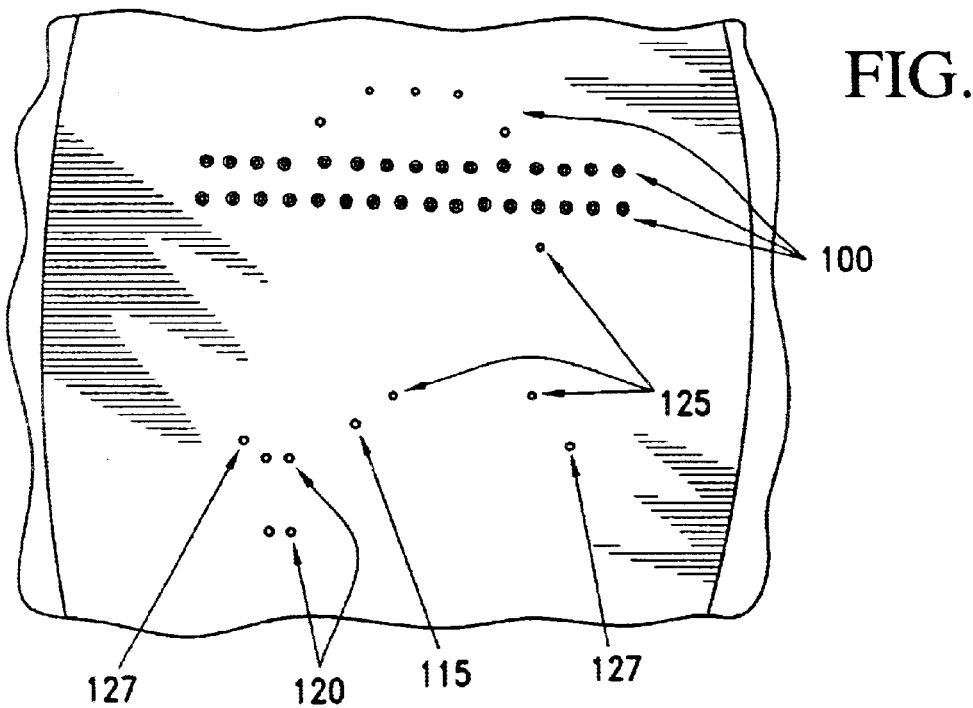
FIG. 11 is plan view of the seat back in accordance with an embodiment of the invention.

As shown in FIG. 10, an inertia reel door 146 may then be attached to the seat back over doubler 170. Inertia reel door 146 preferably comprises an aluminum plate having a plurality of attachment holes formed therein. Inertia reel door may be attached to the seat back by, e.g., screws 148. In addition, the edges of inertia reel door 146 are preferably contoured to match the curvature of the seat back. Preferably, inertia reel door 146 and doubler 170 are formed to match the contour of the ejection seat. In order to achieve contour matching, the instant inventors constructed a model seat that copied the contour of the ejection seat and formed the door according to the model. Advantageously, inertia reel door 146 provides ready and easy access to the inertia reel assembly and facilitates maintenance and replacement.

An alternate embodiment of the invention is described with reference to FIGS. 11 to 14. Like reference numerals are used to refer to like elements. As in the previously described embodiment, seat back doubler 170 may be installed onto the ejection seat. As part of that installation, referring to FIG. 11, existing rivets are preferably removed from the front of the seat back in preparation for doubler installation. More particularly, a first set of existing rivets may be removed from upper flanges of the seat back, vertical support brackets and inertia reel roller brackets (not shown) exposing a first set of rivet holes 100. In the illustrated embodiment, approximately 35 rivet holes 100 are exposed. A second set of existing rivets may be removed from a first vertical support bracket exposing a second set of rivet holes 115. In preferred embodiments, the second set of existing rivets may comprise one or more rivets. In the illustrated embodiment, the second set of existing rivets comprises a single rivet. A third set of existing rivets may be removed from a second bracket exposing a third set of rivet holes 120. If present, tape may be removed from the seat back skin as well as screws exposing screw holes 125. Snaps may then be removed from the seat back exposing snap holes 127. The rivets, snaps and screws may be removed in any desired order.

Figure 12:
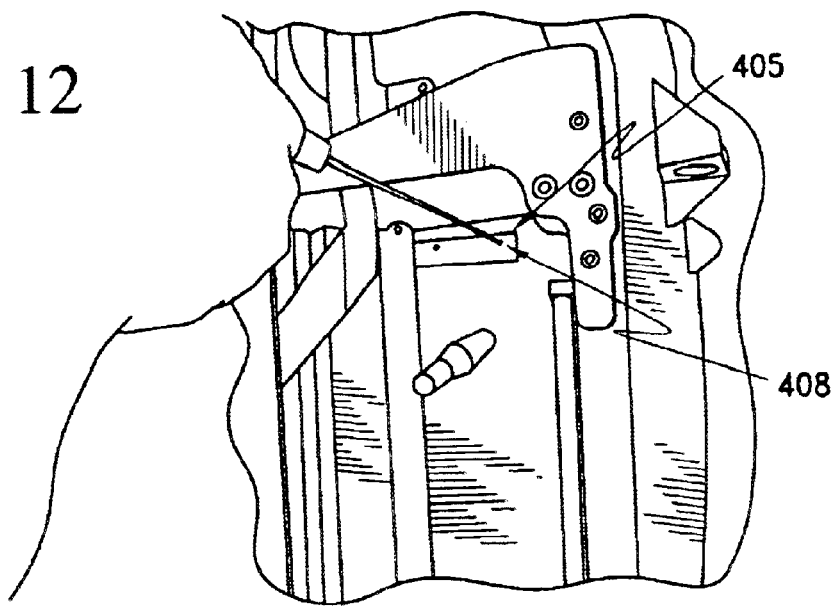
FIG. 12 is a perspective view of the rear of the seat back.

On the rear surface of the seat back, a drill template 405 may be positioned and manually held in place. A preferred drill template is EW 392T1002-301 available from the present assignee. Drill template 405 preferably comprises a substantially rectangular plate-like structure having a step and has a preferred length of approximately 5.2 inches and a preferred width of approximately 0.81 inches. In keeping with the invention, the length and width of drill template 405 may vary according to the physical characteristics of the seat. Drill template 405 may be centered and urged against a lower flange of the upper shelf of the rear of the seat back, as illustrated in FIG. 12. A pair of router alignment holes 408 may then be drilled into the seat back to provide for upper alignment of router fixture 150.

Figure 13:
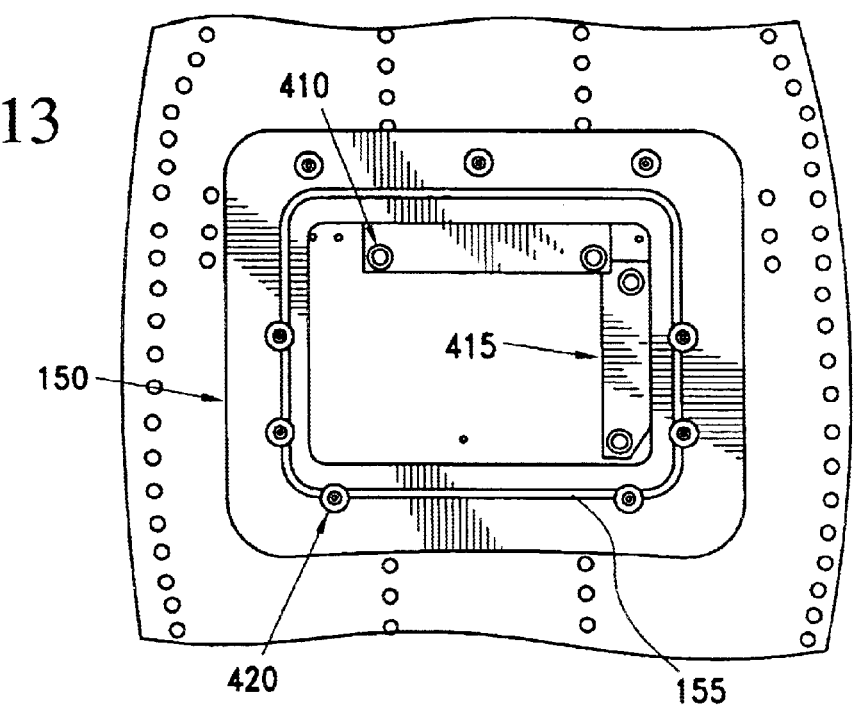
FIG. 13 shows the drill template and the top and side spacers attached to the seat back in accordance with an aspect of the invention.

Following creation of alignment holes, the seat back router fixture 150 is preferably fastened to the front of the seat back as illustrated in FIG. 13. In keeping with an aspect of the invention, top spacer 410 and side spacer 415 may be employed to properly position router template 150. Top spacer 410 is preferably a substantially flat metal sheet having a length of about 5.2 inches and a width of about 1.06 inches and having apertures disposed about 0.5 inches from respective ends. In keeping with the invention, the length and width of drill template 410 and the location its apertures may vary according to the physical characteristics of the seat. A preferred top spacer is available from the present assignee under the trade designation 392T1002-111. A preferred side spacer is available from the present assignee under the trade designation 392T1002-211.

The apertures of top spacer 410 are preferably aligned with the router alignment holes and top spacer 410 is preferably attached to the front the seat back by, e.g., Cleco fasteners. The apertures of side spacer 415 are preferably aligned with screw holes 125 and side spacer 415 is preferably attached to the front seat back by, e.g., Cleco fasteners. Top spacer 410 and side spacer 415 are preferably disposed substantially perpendicular to each other.

Router template 150 may then be placed against the front of the seat back and aligned with top fixture 410 and side fixture 415 as illustrated in FIG. 13 such that the inner periphery of frame 155 is adjacent top spacer 410 and side spacer 415. Pick-up holes 420 may then be drilled into the seat back along frame 155 of router template 150. Router template 150 is preferably attached to the front of the seat back using e.g., Cleco fasteners.

Figure 14:
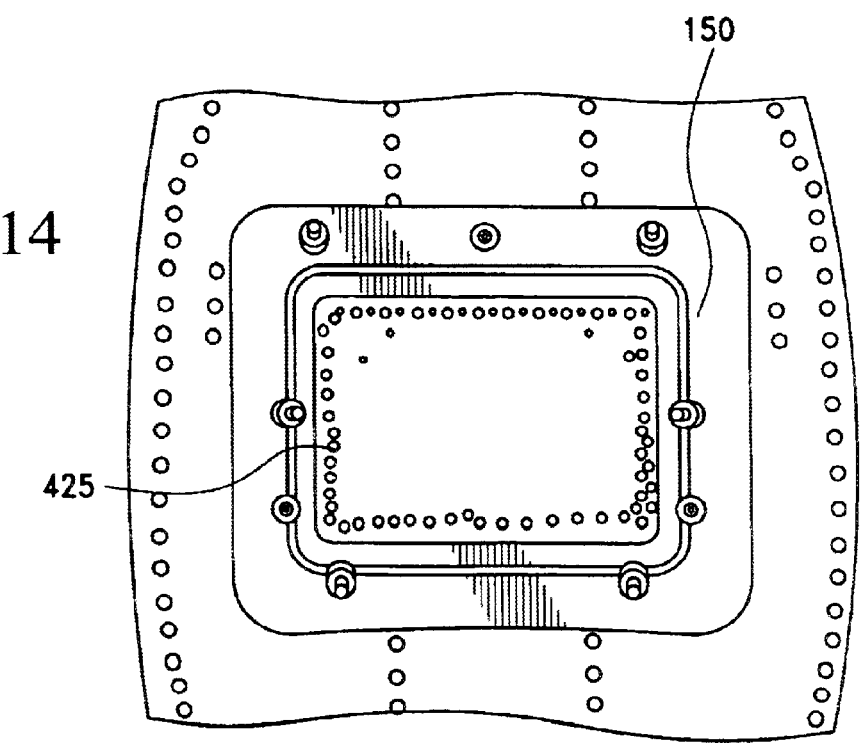
FIG. 14 illustrates the perforations formed in the seat back in accordance with an aspect of the invention.

After router template 150 is attached to the front the seat back, a series of perforations 425, preferably 0.25 inches in diameter, are preferably created along the inner periphery of frame 155 offset approximately 0.2 to 0.5 inches from the inside edge of frame 155 as shown in FIG. 14. Preferably, perforations 425 are disposed about 0.3 inches from the inside edge of frame 155. An opening may be cut in the front of the seat back by following perforations 425 with a router. It is particularly desirable to ensure that the tope edge of the opening is within 0.015 inches of the flanges of the web. In preferred embodiments, a router having a 0.62 inch collar may be used to create the opening and the collar may be removed to re-route the opening to finished size.

A doubler may then be installed to provide reinforcement for the inertia reel door as described above in paragraphs 39–41. Likewise, as described in paragraphs 42 and 43, a track system may be installed into the seat back.

The present invention is particularly useful in the repair and refurbishment of aircraft seats. More specifically, the present invention provides substantial savings of time and labor in connection with servicing inertial reels for ejection seats, specifically ACES II ejection seats.

Those skilled in the art will appreciate that various adaptations and modifications of the above described preferred embodiments can be configured without departing from the scope and spirit of the invention. Therefore, it is to be understood that, within the scope of the appended claims, the invention may be practiced other than as specifically described herein.

We claim:

1. A method for attaching an inertia reel door to an ejection seat comprising:
    removing rivets from the ejection seat back and exposing rivet holes;
    opening a first set of alignment holes in the seat back;
    aligning a router template with the first set of alignment holes;
    attaching the router template to the seat back;
    cutting an aperture in the seat back along an inner periphery of the router template forming a hollow in the seat back;
    detaching the router template from the seat back;
    aligning a doubler with the alignment holes and rivet holes in the seat back;
    attaching the doubler to the seat back; and
    attaching an inertia reel door to the doubler.

2. The method of claim 1 wherein removing rivets from the seat back exposes a first set of existing rivet holes, a second set of existing rivet holes and a third set of existing rivet holes.

3. The method of claim 1 wherein opening a first set of alignment holes includes positioning a drill template on the seat back and drilling the first set of alignment holes through the drill template.

4. The method of claim 3 wherein the first set of alignment holes forms a U shaped pattern.

5. The method of claim 4 further comprising opening a second set of alignment holes in the seat back.

6. The method of claim 5 wherein the second set of alignment holes forms a square.

7. The method of claim 5 wherein opening a first set of alignment holes includes affixing said drill template to the seat back and drilling the second set of alignment holes through the drill template.

8. The method of claim 5 wherein attaching the router template to the seat back includes positioning the router template such that the inner edge of the frame of the router template is disposed proximate to the web and fairing of the ejection seat.

9. The method of claim 8 wherein attaching the router template to the seat back includes aligning attachment holes of the router template with alignment holes the first and second set of alignment holes.

10. The method of claim 3 wherein the drill template is positioned on the rear of the seat back.

11. The method of claim 10 wherein attaching the router template to the seat back includes attaching a top spacer and a side spacer to the rear of the seat back and positioning the router template such that an inner periphery of the frame is adjacent the top spacer and the side spacer.

12. The method of claim 11 further comprising creating a plurality of perforations along the inner periphery of the frame.

13. The method of claim 1, wherein the hollow defines a modified box structure including an upper surface, a lower surface, a rear surface and at least one side surface, said method further comprising removing the inertia reel from the hollow, installing at least one track on the upper surface of the hollow and attaching a slide to the inertia reel, the slide being configured to engage the track such that the inertia reel is slidingly removable from the hollow.

14. The method of claim 1 further comprising installing at least one track in the hollow and mounting an inertia reel to the at least one track.

15. An inertia reel door kit for retrofitting an inertia reel door to an ejection seat, the kit comprising:
   an inertia reel door;
   a drill template for creating alignment holes in the ejection seat back to facilitate mounting of said inertia reel door to the ejection seat;
   a seat back router template comprising an aperture defined by a substantially rectangular frame, the frame having a plurality of attachment holes; and
   a doubler for providing reinforcement for the inertia reel door.

16. The inertia reel door kit of claim 15 wherein said drill template includes a plate having a plurality of alignment holes.

17. The inertia reel kit of claim 16 wherein the plurality of alignment holes include a plurality of alignment holes of a first diameter and a plurality of alignment holes of a second diameter.

18. The inertia reel kit of claim 17 wherein the plurality of alignment holes of the first diameter are disposed in a U shaped pattern and the plurality of alignment holes of the second diameter are disposed in a square pattern circumscribing the U shaped pattern.

19. The inertia reel kit of claim 18 wherein said seat back router template includes (i) a frame having an inner periphery and a plurality of attachment holes and (ii) an aperture defined by the inner periphery.

20. The inertia reel kit of claim 19 further comprising a top spacer and a side spacer for positioning said seat back router template.

21. The inertia reel kit of claim 15 wherein said doubler includes (i) a frame having a plurality of attachment holes of a first diameter and a plurality of attachment holes of a second diameter and (ii) an aperture defined by an inner periphery.

* * * * *